(12) United States Patent
Shue et al.

(10) Patent No.: US 7,185,515 B2
(45) Date of Patent: Mar. 6, 2007

(54) INVERT ARM ASSEMBLY FOR GLASSWARE FORMING MACHINE

(75) Inventors: Larry N. Shue, Woodville, OH (US); Paul B. Mohr, Waterville, OH (US); David D. Soley, Toledo, OH (US); Ronald P. Warnecke, Monclova, OH (US); Thomas R. Kirkman, Perrysburg, OH (US); William F. Mazur, Waterville, OH (US); Jonathan R. Nadler, Bowling Green, OH (US); W. Patrick Holbrook, Elmore, OH (US); D. Wayne Leidy, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 569 days.

(21) Appl. No.: 10/609,444

(22) Filed: Jun. 27, 2003

(65) Prior Publication Data

US 2005/0005647 A1    Jan. 13, 2005

(51) Int. Cl.
  *C03B 9/44* (2006.01)
  *H05K 5/00* (2006.01)
(52) U.S. Cl. .................... 65/236; 65/241; 65/260; 414/682; 414/692; 414/699
(58) Field of Classification Search ................ 65/235, 65/236, 241, 260; 414/680, 682, 692, 699
  See application file for complete search history.

(56) References Cited

U.S. PATENT DOCUMENTS

| | | | |
|---|---|---|---|
| 3,445,218 A * | 5/1969 | Trudeau | 65/235 |
| 3,573,027 A * | 3/1971 | Nuzum | 65/235 |
| 4,461,637 A | 7/1984 | Jones et al. | |
| 4,652,291 A * | 3/1987 | Hirt | 65/68 |
| 4,906,269 A | 3/1990 | Härkönen et al. | |
| 4,986,844 A | 1/1991 | Fenton | |
| 5,005,907 A | 4/1991 | Caillol | |
| 5,119,687 A | 6/1992 | Naruoka et al. | |
| 5,271,756 A | 12/1993 | Peterson et al. | |
| 5,345,389 A | 9/1994 | Calvin et al. | |
| 5,425,794 A | 6/1995 | Frederick et al. | |

(Continued)

FOREIGN PATENT DOCUMENTS

DE    10138529    9/2002

(Continued)

*Primary Examiner*—Steven P. Griffin
*Assistant Examiner*—Carlos Lopez

(57) ABSTRACT

An invert assembly for an individual section glassware forming machine includes an invert base that is oscillated about an axis between angularly spaced apart first and second positions, a double ended ball screw positioned co-axially with the axis and having spaced apart oppositely threaded portions, first and second nuts each threadably engaging one of the oppositely threaded portions of the ball screw so that the nuts reciprocate toward and away from each other in response to rotation of the ball screw, and first and second neck ring arms respectively engaging the first and second nuts so that the neck ring arms reciprocate toward and away from each other along the axis with the first and second nuts. Preferably, the invert base is oscillated about the axis by a first reversible electric motor, and the ball screw is driven for rotation in opposed directions by a second reversible electric motor to move the nuts and neck ring arms toward and away from each other along the axis.

73 Claims, 11 Drawing Sheets

U.S. PATENT DOCUMENTS

| | | |
|---|---|---|
| 5,445,662 A | 8/1995 | Peterson et al. |
| 5,458,668 A | 10/1995 | Shoji |
| 5,547,485 A | 8/1996 | Jones |
| 5,562,751 A | 10/1996 | Peterson et al. |
| 5,588,328 A | 12/1996 | Nihei et al. |
| 5,588,981 A * | 12/1996 | Eilers .......................... 65/241 |
| 5,609,659 A | 3/1997 | Peterson et al. |
| 5,609,663 A | 3/1997 | Nguyen et al. |
| 5,649,989 A | 7/1997 | Jones |
| 5,649,991 A | 7/1997 | Jones |
| 5,652,490 A | 7/1997 | Bradshaw et al. |
| 5,685,197 A | 11/1997 | Baker et al. |
| 5,732,596 A | 3/1998 | Erikson et al. |
| 5,746,091 A | 5/1998 | Schaede |
| 5,814,119 A | 9/1998 | Jones et al. |
| 5,819,588 A | 10/1998 | Deane et al. |
| 5,843,201 A | 12/1998 | Borbone et al. |
| 5,846,282 A | 12/1998 | Pinkerton et al. |
| 5,876,476 A | 3/1999 | Borbone et al. |
| 5,938,809 A | 8/1999 | Mungovan et al. |
| 6,006,622 A | 12/1999 | Bischof et al. |
| 6,155,376 A | 12/2000 | Cheng |
| 6,237,434 B1 | 5/2001 | Brown et al. |
| 6,247,377 B1 | 6/2001 | Long et al. |
| 6,293,166 B1 | 9/2001 | Genter et al. |
| 6,301,334 B1 | 10/2001 | Tybinkowski et al. |
| 6,722,488 B2 * | 4/2004 | Gerber et al. ............ 198/468.2 |
| 6,848,273 B2 * | 2/2005 | Leidy et al. .................. 65/260 |
| 6,966,428 B1 * | 11/2005 | Flynn .................... 198/468.01 |
| 7,047,766 B2 * | 5/2006 | Schneider et al. ............ 65/236 |
| 2002/0035409 A1 | 3/2002 | Lingua et al. |
| 2002/0052669 A1 | 5/2002 | Nittardi et al. |
| 2002/0194871 A1 | 12/2002 | Simon |

FOREIGN PATENT DOCUMENTS

| | | |
|---|---|---|
| EP | 1207138 | 5/2002 |

* cited by examiner

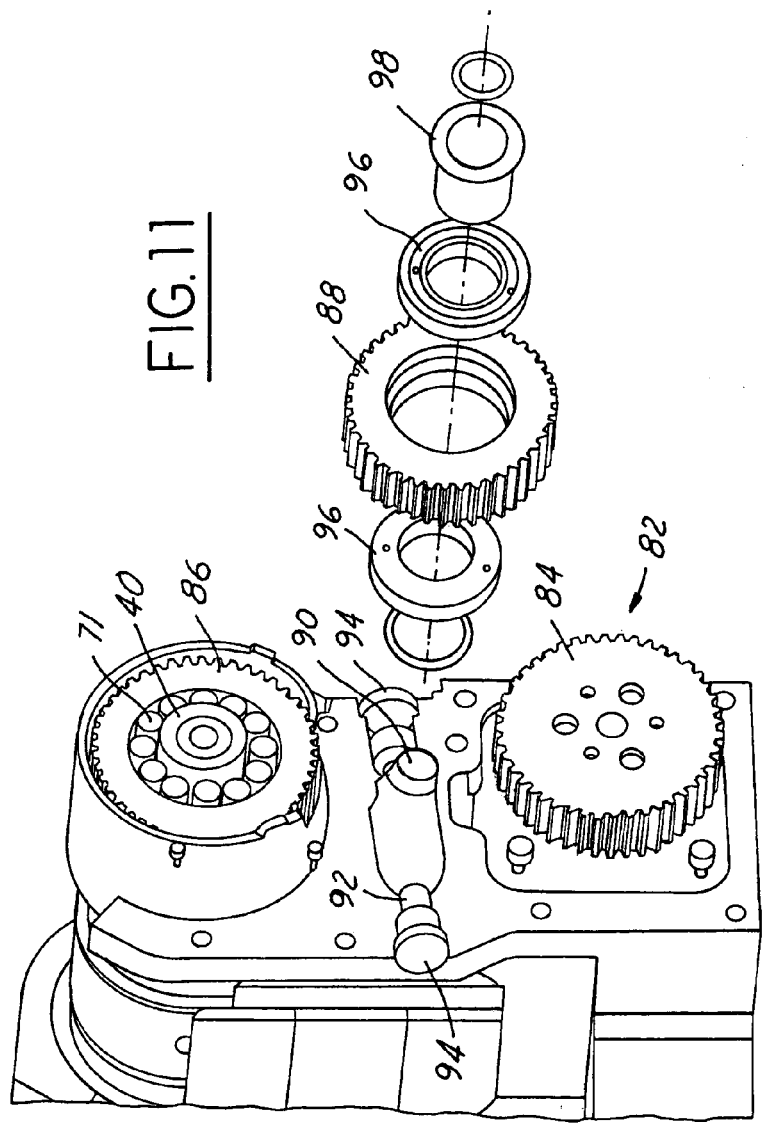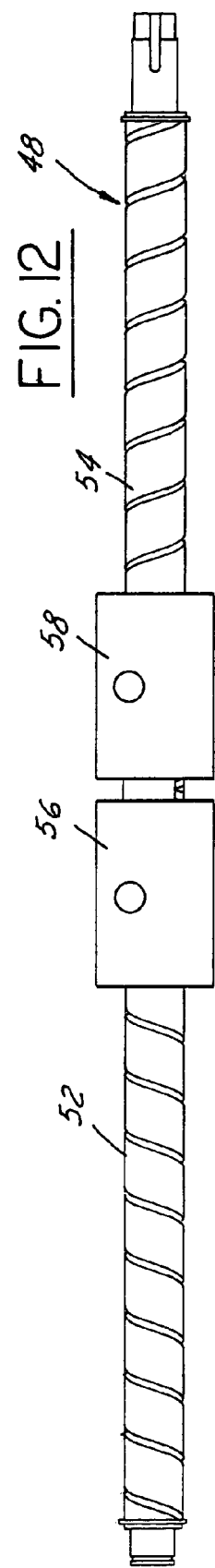

INVERT ARM ASSEMBLY FOR GLASSWARE FORMING MACHINE

FIELD OF THE INVENTION

The present invention relates generally to glassware forming machines, and more particularly to an invert arm assembly for an individual section glassware forming machine.

BACKGROUND OF THE INVENTION

Individual section glassware forming machines typically include an invert arm assembly which is oscillated or rotated approximately 180 degrees to transfer a glass blank from a blank mold to a final (blow) mold in which the glassware is formed into its desired final shape. A glass parison is received in a mold cavity of a blank mold to form a blank which is carried by neck ring arms on the invert arm. The invert arm is then inverted by rotation about a longitudinal axis to dispose the blank into the final mold. Thereafter, the invert arm is returned to its starting position to transfer a subsequent blank to a final mold. In addition to the rotatable inversion and reversion of the invert arm, the neck ring arms must also move relative to each other to open and close so that they may engage a blank for transfer to a final mold, and thereafter release the blank at the final mold station.

Typically, the rotatable inversion and reversion of the invert arm is controlled by a rack and pinion assembly. To open and close the neck ring arms to facilitate engaging and releasing a blank or parson, the arms typically have each been driven by a separate pneumatic or hydraulic cylinder.

SUMMARY OF THE INVENTION

An invert assembly for an individual section glassware forming machine includes an invert base that is oscillated about an axis between angularly spaced apart first and second positions, a double ended ball screw positioned co-axially with the axis and having spaced apart oppositely threaded portions, first and second nuts each threadably engaging one of the oppositely threaded portions of the ball screw so that the nuts reciprocate toward and away from each other in response to rotation of the ball screw, and first and second neck ring arms respectively engaging the first and second nuts so that the neck ring arms reciprocate toward and away from each other along the axis with the first and second nuts. Preferably, the invert arm is oscillated about the axis by a first reversible electric motor, and the ball screw is driven for rotation in opposed directions by a second reversible electric motor to move the nuts and neck ring arms toward and away from each other along the axis.

According to one presently preferred embodiment, the invert arm includes a ball spline shaft assembly. The ball spline shaft assembly includes a shaft having at least one groove formed therein, a plurality of balls received in the at least one groove, and a pair of ball spline nuts carried by the shaft. When the ball spline shaft is rotated, the balls engage a shoulder or groove in the ball spline nuts to cause rotation of the ball spline nuts with the ball spline shaft. Preferably, more than one grove is formed in the shaft, with a set of balls arranged in the several grooves.

In another presently preferred construction and arrangement, the invert arm is coupled to the first electric motor through a plurality of gears. A drive gear is connected to and driven for rotation by the motor, a driven gear is connected to the invert arm or a shaft which drives the invert arm, and an idler gear is positioned between the drive gear and the driven gear. The idler gear is mounted by an eccentric member to permit movement of the idler gear relative to the drive gear and driven gear to reduce backlash in the drive and gear assembly. Desirably, the eccentric mounting of the idler gear permits adjustment of the position of the idler gear to maintain proper center distance between the gears even though the relative spacing of the gears may be different in one apparatus compared to the next apparatus due to, for example, machining tolerances.

In another presently preferred construction and arrangement, the neck ring arms may be driven between open and closed positions through a plurality of gears. A drive gear is preferably driven by the reversible electric motor associated with the neck ring arms, a driven gear is operably associated with the neck ring arms, and a pair of idler gears are disposed so that each is engaged with both the drive gear and the driven gear. The idler gears are preferably connected together by a suspension mechanism and are yieldably biased towards each other to ensure the idler gears remain in proper tooth mesh with the drive and driven gears. In one direction of rotation of the drive gear to open the neck ring arms, one of the idler gears transmits the load between the drive gear and the driven gear, while the other idler gear is essentially a non-load transmitting gear. The non-load transmitting idler gear is maintained in proper mesh contact with the drive gear and driven gear by the suspension mechanism. In the opposite direction of rotation of the drive gear to close the neck ring arms, the formally non-load transmitting idler gear becomes the load transmitting gear, and vice versa. Again, the non-load transmitting idler gear for this direction of rotation is held in proper mesh position with the drive gear and driven gear by the suspension mechanism so that it is in place and can transmit the load between the drive gear and driven gear when the direction of the electric motor is reversed. The yieldable biasing of the suspension mechanism joining the idler gears provides a "floating" suspension that both permits the load transmitting idler gear to move into a desired position relative to the drive and driven gear to reduce backlash in the gear train, and also maintains the non-load transmitting idler gear generally in its proper position so that when the direction of the electric motor is reversed, it can become the load transmitting idler gear.

In another presently preferred construction and arrangement, the components of the invert arm assembly are contained within a modular unit so that by simply providing power to the electric motors, and any needed or desired cooling or lubricating fluids to the unit, the entire unit is operational. Desirably, the modular unit includes a plurality of utility connectors carried by housing, and provides for a single location for all fluid and electrical connections needed to operate the invert arm assembly modular unit. The utility connector module may include, for example without limitation, a motor power connector, a resolver connector, a fluid inlet, and a fluid outlet. Desirably, each of these connectors can be secured to a mating connector simultaneously.

In one form, the utility connectors are of a blind mate, quick connect type and are slidably enagageable with mating connectors. This permits generally simultaneous connection of all the utility connectors with their respective mating connectors when the housing is put in its proper location for use of the apparatus. In one presently preferred form, the utility connectors are disposed adjacent the bottom of the housing and when the housing is located on its support surface, such as a floor, the utility connections are automatically made. Desirably, the electric and fluid supply lines may be in or beneath the floor and out of the way of the apparatus and other things above ground.

BRIEF DESCRIPTION OF THE DRAWINGS

These and other objects, features and advantages of this invention will be apparent from the following detailed description of the preferred embodiments and best mode, appended claims and accompanying drawings in which:

FIG. 11 is a fragmentary exploded perspective view illustrating an eccentric mounting assembly for an idler wheel of the invert arm drive train;

FIG. 12 is side view of a ball screw and nut assembly used to move the neck ring arms between their open and closed positions;

DETAILED DESCRIPTION OF THE PREFERRED EMBODIMENTS

Figure 1:
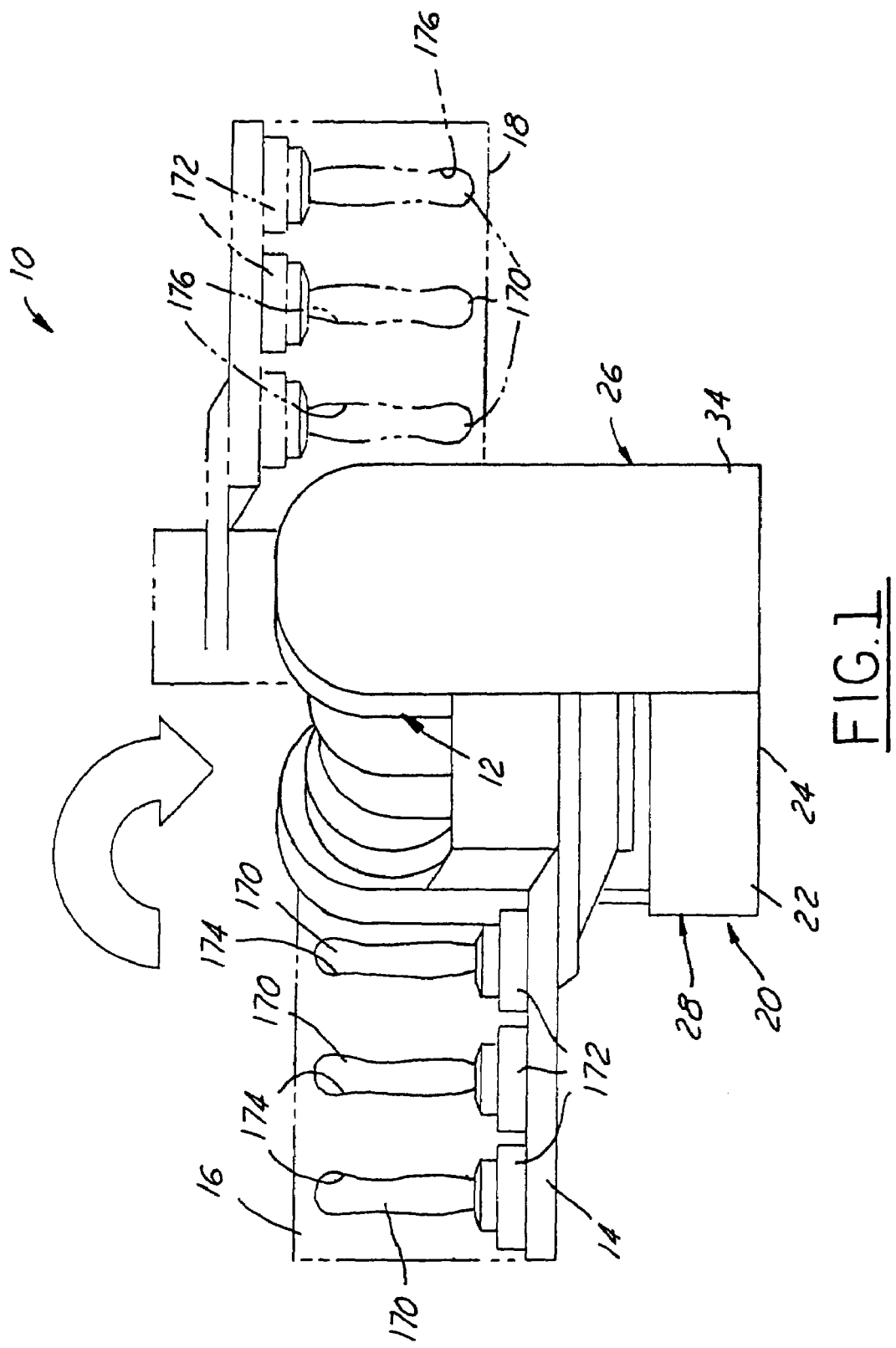
FIG. 1 is a perspective view of an invert arm assembly for use in an individual section glassware forming machine.
Figure 2:
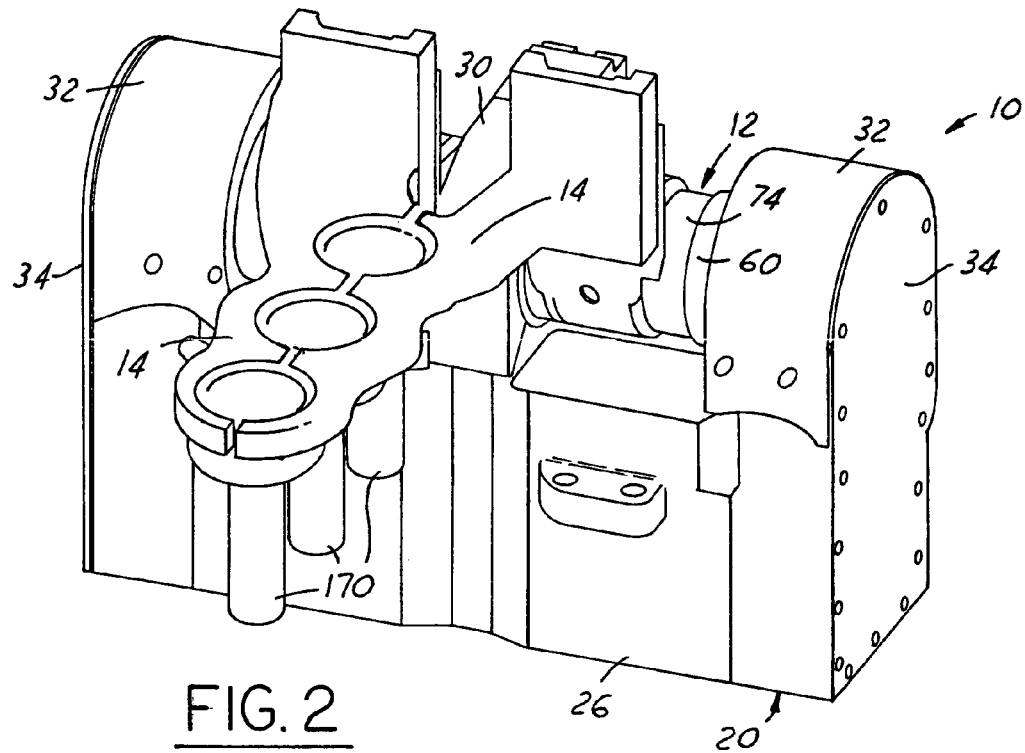
FIG. 2 is another perspective view of the invert arm assembly shown in FIG. 1 illustrating first and second neck ring arms inverted and in a closed position.
Figure 3:
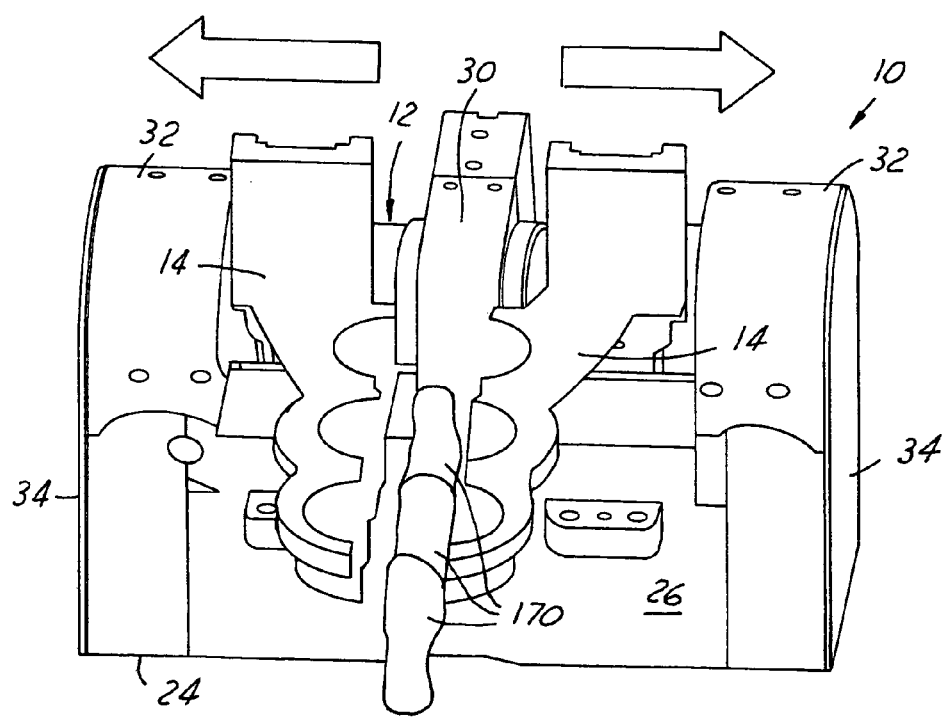
FIG. 3 is a perspective view of the invert arm assembly showing the neck ring arms inverted and in an open position.

Referring in more detail to the drawings, FIGS. 1–3 illustrate one presently preferred embodiment of an invert arm assembly 10 for an individual section glassware forming machine. The assembly 10 includes an invert base 12 that is oscillated between angularly spaced first and second positions, typically substantially 180° spaced from each other. A pair of neck ring arms 14 are carried by the invert base 12 for oscillation with the invert arm. In the first position of the invert base 12, the neck ring arms 14 are disposed adjacent to a blank mold 16 in which one or more glass parisons are received. The neck ring arms 14 are moveable relative to each other between open (FIG. 3) and closed (FIG. 2) positions to engage the glass parisons or blanks at the blank mold 16, and then inverted the parisons when the invert base 12 is rotated to its second position to transfer the glass blanks to a blow mold side of the apparatus. Accordingly, when the invert base 12 is rotated to its second position, the neck ring arms 14 carry the glass blanks to a blow mold 18 in which the blanks are blow molded into their desired final shape. After the blanks have been transferred to the final mold, the neck ring arms 14 are moved to their open position (FIG. 3) and the invert base 12 is rotated back to its first position transferring the neck ring arms 14 back to the blank side of the assembly in preparation for a subsequent cycle.

The invert arm assembly 10 is preferably contained within a housing 20 that is sealed to prevent leakage of coolant or lubricating fluid from the housing. In the embodiment shown, the housing 20 preferably includes a main case 22 having a bottom wall 24 and upstanding front and back walls 26, 28, respectively. Attached to the main case 22 is a semi annular or generally U-shaped center cover 30 that in part supports and retains the invert base 12 of the assembly. Also attached to the main case 22 are a pair of outer covers 32 which likewise help to support and retain the invert arm 12. Closing the outer sides of the main case 22 and the outer covers 32 are a pair of side plates 34, and a gasket is preferably disposed between each side plate 34 and the main case 22 and outer covers 32 to prevent fluid leakage between them. When connected to the main case 22, each of the center and outer covers 30, 32 defines a generally circular opening or passage in which the invert base 12 is received for reciprocation between angularly spaced first and second positions.

As best shown in FIGS. 4, 9, 10 and 13–15, the invert base 12 includes a ball spline shaft 40 which drives first and second ball spline nuts 42, 43 respectively, to which the neck ring arms 14 are attached, in response to rotation or oscillation of the ball spline shaft 40 to invert and revert the neck ring arms 14 between the blank side and blow mold side of the assembly. Desirably, a first servo controlled electric motor 44 drives the ball spline shaft 40 between its first and second positions by rotating the shaft 40 along a longitudinal axis 46. The assembly also includes a ball screw 48 mounted co-axially within the ball spline shaft 40 and rotated by a second reversible electric motor 50. The ball screw 48 has two oppositely threaded portions 52, 54 (FIG. 12) and first and second ball screw nuts 56, 58 respectively disposed one on each of the oppositely threaded portions 52, 54 of the ball screw 48. The ball screw 48 is driven in opposed directions by the motor 50 causing the first and second nuts 56, 58 to reciprocate along the ball screw 48 toward and away from each other. The ball spline nuts 42, 43 are operably connected to the first and second ball screw nuts 56, 58 so that the ball spline nuts 42, 43 are reciprocated toward and away from each other along the longitudinal axis as the ball screw nuts 56, 58 are reciprocated. In this manner, the first electric motor 44 inverts and reverts the neck ring arms 14 about the longitudinal axis through the spline shaft assembly, and the second electric motor 50 moves the neck ring arms 14 toward and away from each other along the longitudinal axis via the ball screw assembly.

Figure 14:
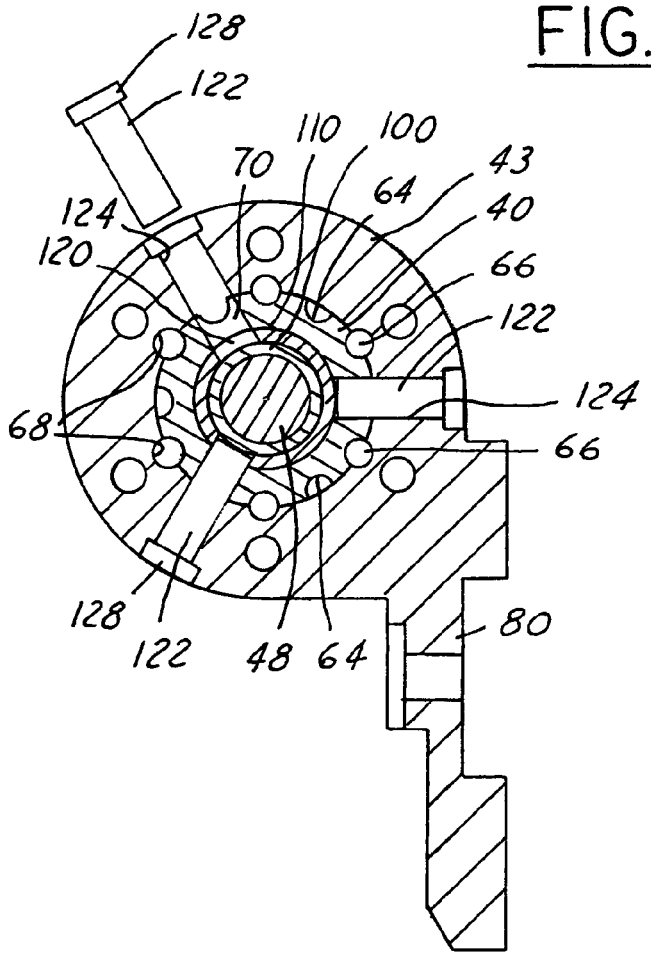
FIG. 14 is a cross-sectional view of the spline shaft assembly taken generally along line 14–14 in FIG. 13.
Figure 15:
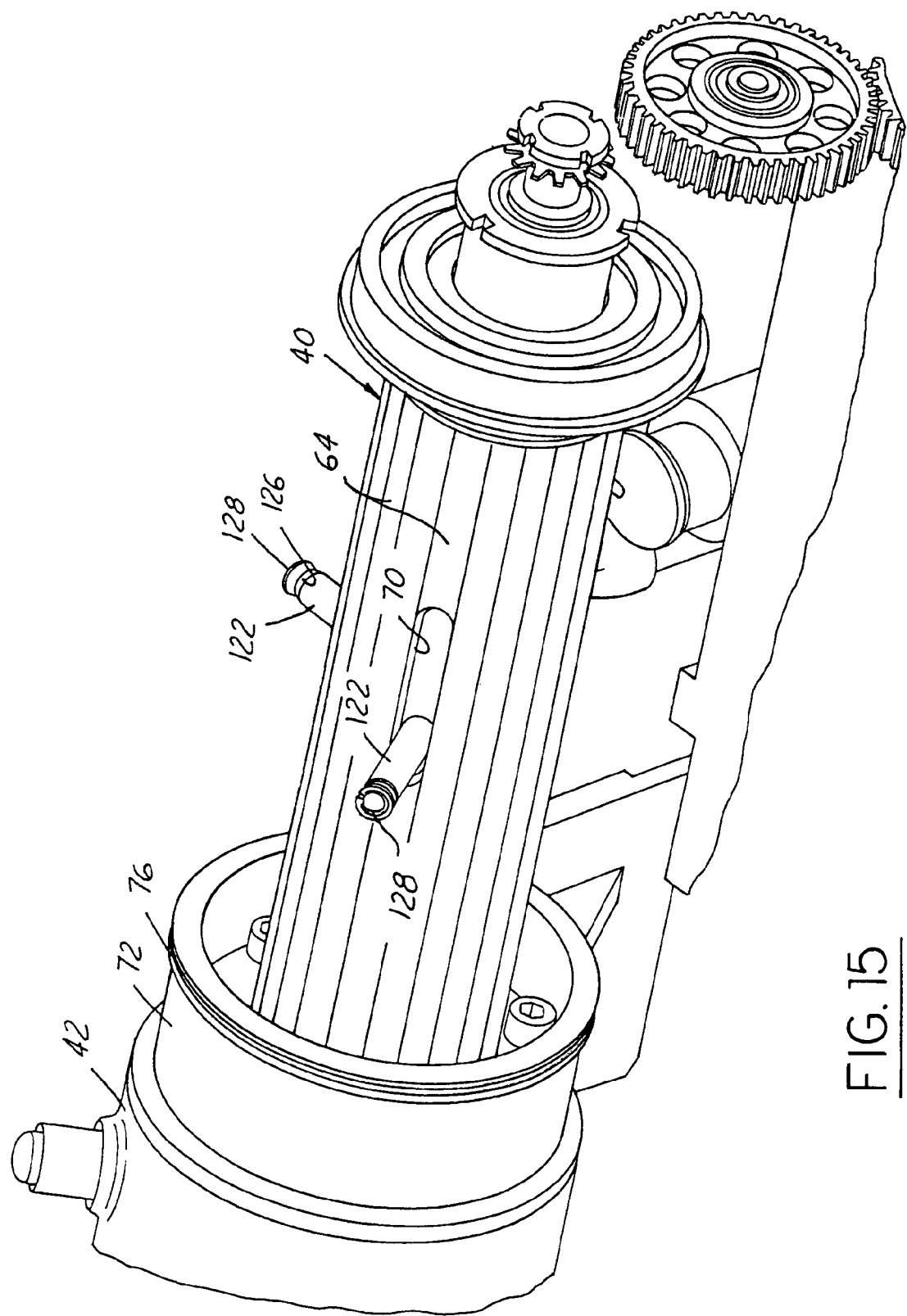
FIG. 15 is a fragmentary perspective view of an end portion of the spline shaft assembly with a ball spline nut removed.

In more detail, as best shown in FIGS. 9, 10 and 13–15, the ball spline assembly includes the ball spline shaft 40, the first and second ball spline nuts 42, 43 carried on the shaft 40, an outer mounting cylinder 60 at each end of the shaft 40 and a central mounting cylinder 62 disposed between the center cover 30 and main case 22 of the housing 20. The ball spline shaft 40 is generally hollow and tubular with a longitudinal axis 46 and a plurality of longitudinally extending grooves 64 formed in its outer surface. As shown, twelve grooves 64 are formed about the exterior of the spline shaft 40, although any number of grooves may be used. Balls 66 are disposed in at least one of the grooves 64, and preferably more than one groove. As shown in FIG. 14, balls 66 are located within six of the grooves 64 in the spline shaft 40 with a portion of each ball 66 extending radially outwardly from the spline shaft 40 for receipt in a complementary groove 68 in an internal surface of one of the ball spline nuts 42, 43. In this manner, the spline shaft 40 and ball spline nuts 42, 43 are connected together for co-rotation or oscillation about the axis 46, with the rotational force being transmitted from the spline shaft 40 to the spline nuts 42,43 through the balls 66. As shown in FIGS. 14 and 15, slots 70 are formed through the ball spline shaft 40 preferably in the area of one or more grooves 64 not occupied by or containing any balls 66. As shown, three generally equally circumferentially spaced slots 70 are formed through the spline shaft 40, each slot 70 extending longitudinally as best shown in FIG. 15.

At each end, the spline shaft 40 is journalled for rotation by suitable bearings 71 (FIGS. 9 and 10) so that the spline shaft 40 can rotate relative to the housing 20 between its first and second positions. The spline shaft 40 may be supported by the central cylinder 62 and the outer cylinders 60 which are supported and retained by the main case 22 and respective covers 30, 32. The central cylinder 62 is open at both sides for slidable receipt of an adjacent portion of the ball spline nuts 42, 43 disposed one on each side of the central cylinder 62. The outer cylinders 60 are likewise open on at least one side for slidable receipt of an adjacent portion of an adjacent ball spline nut 42, 43.

The ball spline nuts 42, 43 are disposed on the ball spline shaft 40 and are connected to the shaft for rotation therewith by the balls 66 disposed between them in the manner previously described. Each ball spline nut 42, 43 is generally cylindrical, hollow and has a pair of opposed sides. Inner and outer cylindrical retainers 72, 74, respectively, are fixed on the opposed sides of each ball spline nut 42, 43, to retain the balls 66 and provide a seal against the mating faces of the ball spline nut 42, 43. The inner retainer 72 associated with each ball spline nut 42, 43 is telescopically and slidably received at least in part within the central cylinder 62. Each of the inner retainers 72 preferably carries a seal 76 along its outside diameter that provides a seal against the inside diameter of the central cylinder 62. The outer retainer 74 associated with each ball spline nut 42,43 is telescopically received in a respective outer cylinder 60 and preferably carries a seal 78 that provides a fluid tight seal between the outer retainer 74 and is associated outer cylinder 60. With this arrangement, the balls 66 are retained between the ball spline nuts 42,43 and the ball spline shaft 40, and the entire ball spline shaft assembly is sealed against leakage of coolant and lubricating fluid.

Attached and preferably integrally formed with each ball spline nut 42,43 is a neck ring paddle 80. Each neck ring paddle 80 extends outwardly from its associated ball spline nut 42, 43 and provides a mounting surface for a separate one of the neck ring arms 14 which are preferably securely fixed to the neck ring paddles 80 for movement with the ball spline nuts 42,43.

The ball spline shaft assembly is driven for rotation in opposed directions by the first electric motor 44 that is preferably mounted within the housing 20. The first electric motor 44 may be servo controlled and is capable of accurately and repeatably oscillating the ball spline shaft 40 about its longitudinal axis 46. The first electric motor 44 is coupled to the ball spline shaft 40 by a suitable drive train 82 including a plurality of gears. A drive gear 84 is coupled to and driven for rotation by the first electric motor 44. A driven gear 86 is coupled to the ball spline shaft 40 for co-rotation of the driven gear 86 and ball spline shaft 40. An idler gear 88 is disposed between the driven gear 86 and the drive gear 84 to transmit the loads between them.

Figure 9:
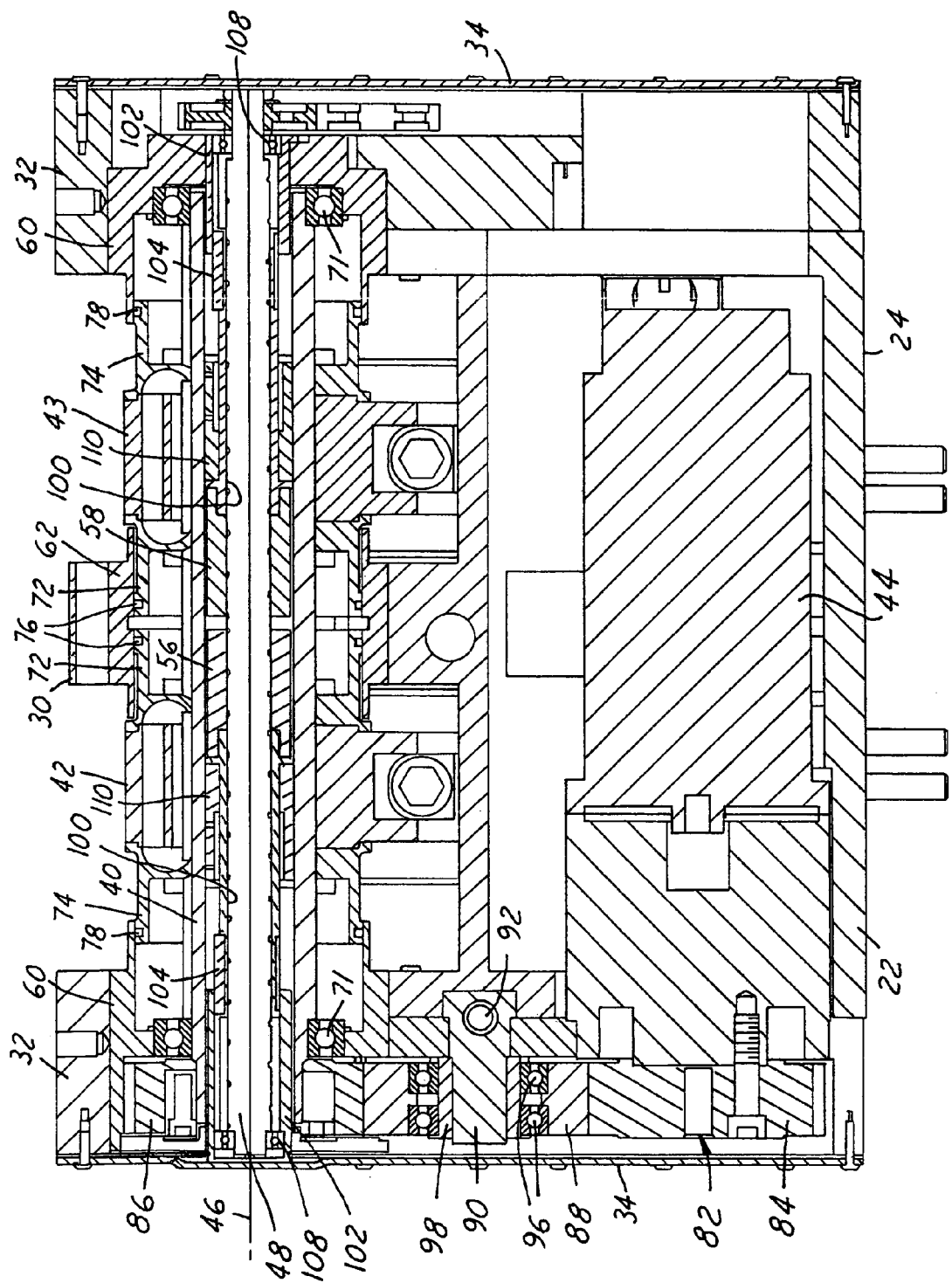
FIG. 9 is a cross-sectional view of the invert arm assembly illustrating, among other things, the drive train for oscillation of the invert arm.

As best shown in FIGS. 9 and 11, to reduce backlash in the drive train 82, the idler gear 88 is preferably adjustable relative to the other gears 84, 86 to ensure a proper center distance and intermeshing of the gears. In one presently preferred form, adjustment of the idler gear 88 is made possible by permitting adjustment of a shaft 90 on which the idler gear 88 is mounted, and by also providing an eccentric mounting of the idler gear 88 to that shaft 90. As shown in FIG. 11, the shaft 90 about which the idler gear 88 rotates is slidably adjustable on a mounting shaft 92, and the position of the shaft 90 may be varied through manipulation of adjustment screws 94 on opposed ends of the mounting shaft 92. In this manner, the idler gear 88 can be moved generally closer to or further away from the drive and driven gears 84,86.

As also shown in FIG. 11, the idler gear 88 is mounted on its shaft 90 by suitable bearings 96 which journal the idler gear 88 for rotation about the shaft 90, and by an eccentric bushing 98 extending through the bearings 96 and the idler gear 88 and coupled to the shaft 90. Rotation of the eccentric bushing 98 permits further adjustment of the idler gear 88 relative to its shaft 90 as well as the drive and driven gears 84,86 to ensure proper mesh contact and a proper spacing between all the gears. The adjustment of the idler gear 88 can, among other things, account for machining and assembly tolerances to provide a desired location and orientation of the gears to provide accurate and repeatable rotation of the spline shaft 40 and to reduce or eliminate backlash in the drive train 82.

Figure 5:
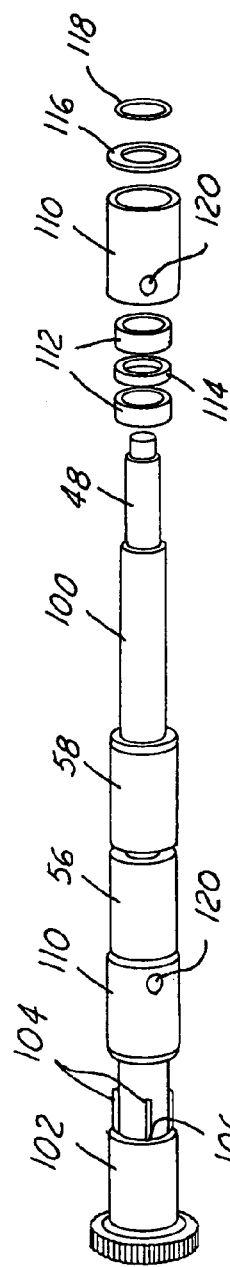
FIG. 5 is an exploded perspective view of a ball screw assembly used to move the neck ring arms between their open and closed positions.
Figure 10:
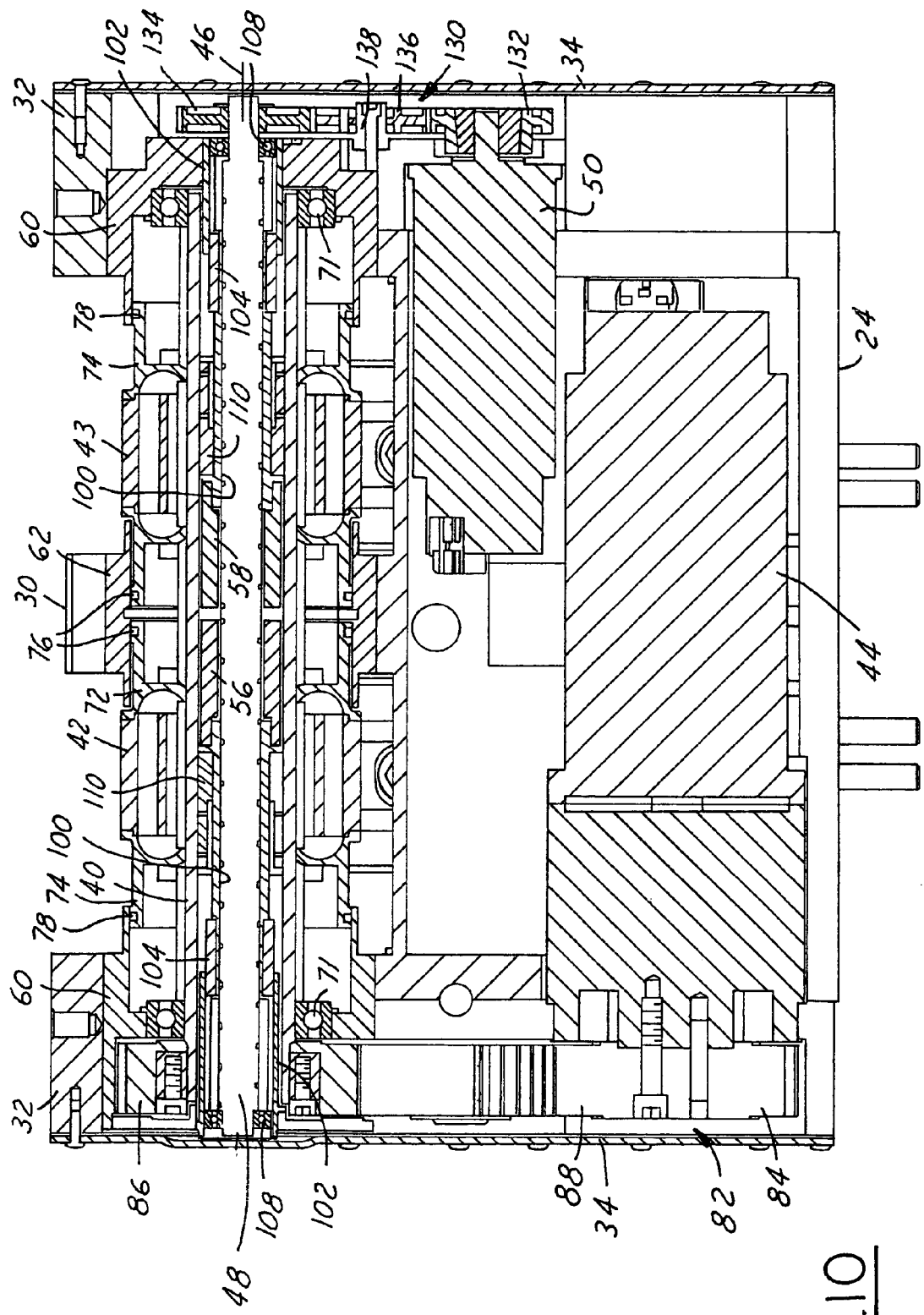
FIG. 10 is a cross-sectional view of the invert arm assembly illustrating, among other things, the drive train for moving the neck ring arms between their open and closed positions.
Figure 13:
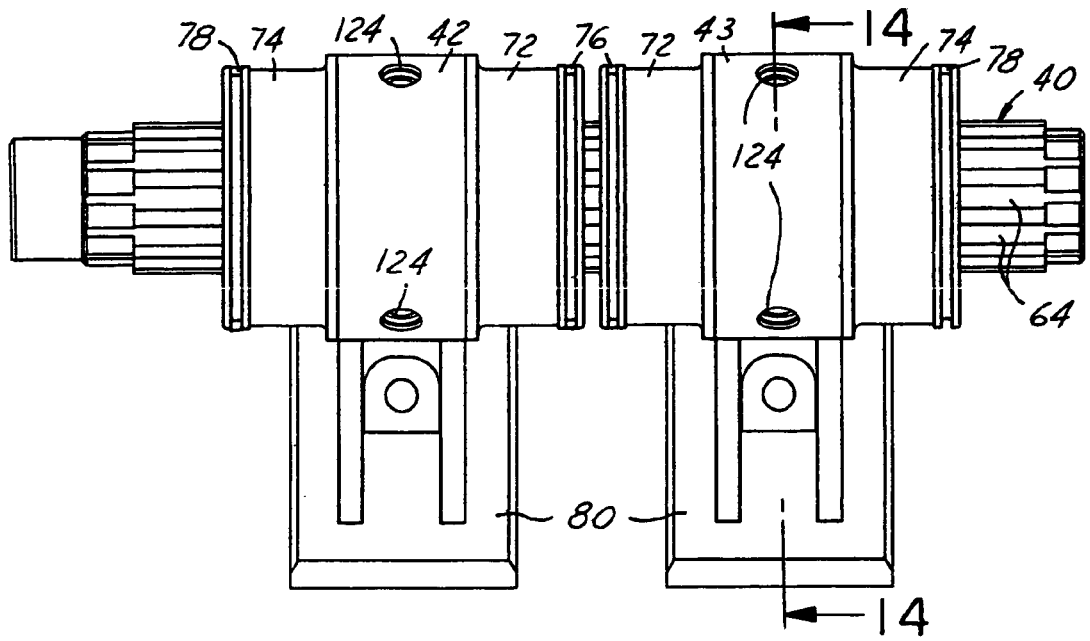
FIG. 13 is a plan view of a spline shaft assembly of the invert arm.

As best shown in FIGS. 5, 9 and 10, to drive the ball spline nuts 42,43 for reciprocation along or parallel to the axis 46, a ball screw assembly is disposed within the ball spline shaft 40. The ball screw assembly includes the ball screw 48 disposed coaxially with the ball spline shaft 40, the pair of oppositely threaded portions, 52,54 (FIG. 12) and first and second ball screw nuts 56,58 each disposed on a separate one of the oppositely threaded portions 52,54 of the ball screw 48. Rotation of the ball screw 48 in one direction causes the ball screw nuts 56,58 to move axially toward each other, and rotation of the ball screw 48 in the other direction causes the ball screw nuts 56,58 to move axially away from each other. Each of the first and second ball screw nuts 56,58 is operably associated with a separate one of the ball spline nuts 42,43 so that the ball spline nuts 42, 43 are driven axially along the ball spline shaft 40 toward and away from each other as the ball screw nuts 56,58 are driven axially relative to the ball screw 48. In this manner, the neck ring arms 14 that are carried by the ball spline nuts 42,43, are moved along the axis 46 toward each other to a closed position and away from each other to an open position.

As best shown in FIGS. 5, 9 and 10, each ball screw nut 56,58 includes a ball nut extension 100 and a torque tube 102. The torque tubes 102 are provided one at each end of the ball screw 48, and are each connected to the housing 20 so that they cannot rotate. In more detail, each ball screw nut 56,58 is fixed to a separate ball nut extension 100 that extends axially along the ball screw 48 and includes a plurality of longitudinally extending keys 104 that are received in complimentary key ways 106 formed in an associated torque tube 102. Hence, the ball nut extensions 100 are prevented from rotating because they are keyed to the torque tubes 102. So that the ball screw nut extensions 100 can move axially relatively to the torque tubes 102, the keys 104 are slidably received in the key ways 106 of the torque tubes 102. At its ends, the ball screw 48 is journalled for rotation relative to the torque tubes 102 by suitable bearings 108. Accordingly, the ball screw nuts 56,58 and ball nut extensions 100 axially reciprocate relative to the torque tubes 102 without rotation, and the ball screw 48 rotates relative to the torque tubes 102.

A pair of bearing sleeves 110 are each mounted for rotation on a separate ball screw nut extension 100, generally between each ball screw nut 56,58 and torque tube 102. Each bearing sleeve 110 is preferably a cylindrical and hollow sleeve disposed over a pair of needle bearings 112 and a spacer 114 disposed between the needle bearings 112, and held in place by a thrust washer 116 and a lock ring 118. Each bearing sleeve 110 is axially reciprocated with its associated ball screw nut 56,58, but is capable of rotation relative to the ball screw nut 56,58 and its associated nut extension 100 on which it is mounted. Each bearing sleeve 110 has at least one opening 120 or cavity formed therein each constructed to receive a clutch pin 122 that extends generally radially from the bearing sleeve 110 and is aligned with a corresponding opening 124 formed in a ball spline nut 42,43.

In this manner, as best shown in FIG. 14, a clutch pin 122 may be inserted through an opening 124 in the ball spline nut 42,43 through a longitudinal slot 70 in the ball spline shaft 40, and into an opening 120 or cavity in the bearing sleeve 110 to operably connect each bearing sleeve 110 with a separate one of the ball spline nuts 42,43. Accordingly, when the bearing sleeves 110 are axially reciprocated along with their associated ball screw nuts 56,58, the ball spline nuts 42,43 are likewise driven for axial reciprocation via the clutch pin 122 which connects the ball screw nuts 56,58 and ball spline nuts 42,43 together. When the ball spline nuts 42,43 are rotated about the longitudinal axis 46 through rotation of the ball spline shaft 40, the bearing sleeves 110 rotate relative to the ball screw nuts 56,58 and ball screw nut extensions 100 without any rotation of the ball screw nuts 56,58 or ball screw nut extensions 100. In this manner, the ball spline nuts 42,43 can rotate relative to the ball screw nuts 56,58, but are axially reciprocated in response to axial reciprocation of the ball screw nuts 56,58. To prevent leakage of coolant or lubricant, each clutch pin 122 may be sealed by an O-ring 126 and may be retained in place by a snap ring 128 or other suitable arrangement.

Figure 4:
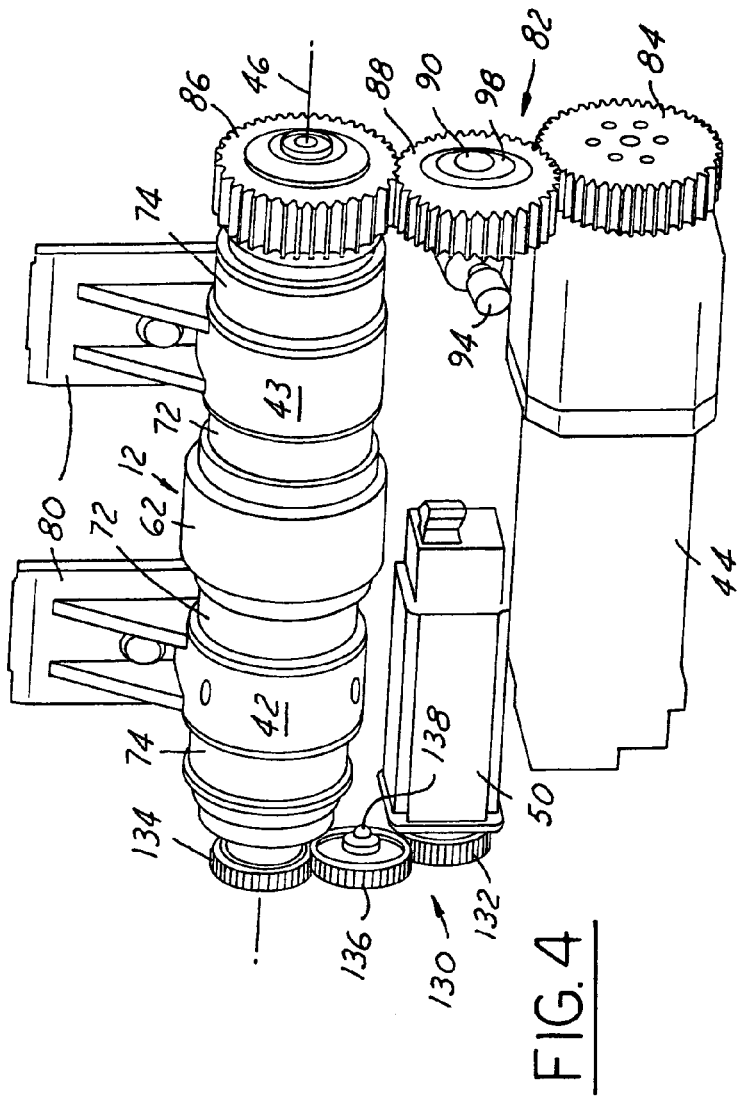
FIG. 4 is a perspective view of a portion of the invert arm assembly with the housing of the assembly removed, and with outer cylinders of a ball spline assembly removed.
Figure 6:
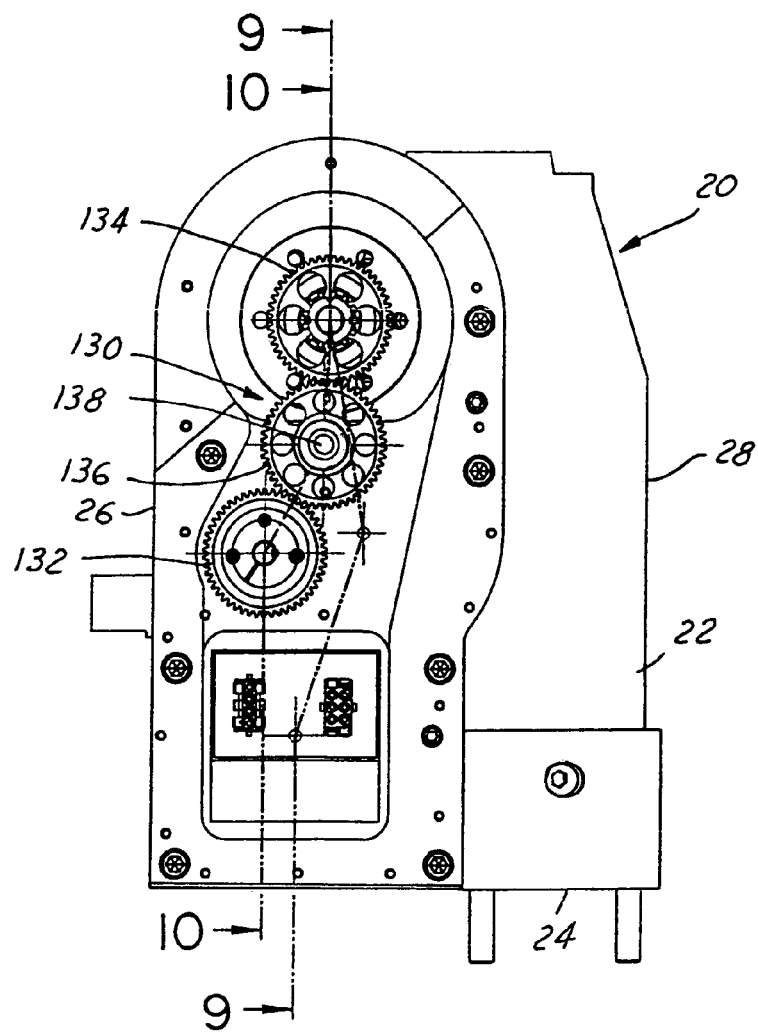
FIG. 6 is an end view of the invert arm assembly.

As shown in FIGS. 4, 6 and 10, the ball screw 48 is driven for rotation by the second reversible electric 50 motor that is preferably received within the housing 20 and coupled to the ball screw 48 through a drive train 130 including a plurality of gears. A drive gear 132 is coupled to and driven for rotation by the second electric motor 50. A driven gear 134 is coupled to the ball screw 48 for co-rotation of the driven gear and ball screw 48. An idler gear 136 is disposed between the drive gear 132 and driven gear 134. The idler gear 136 is mounted for rotation on a shaft 138 which may be carried by or fixed to the housing 20. The location of the shaft 138, and hence the idler gear 136, relative to the other gears may be adjustable if desired. This adjustment may take the form of the adjustable shaft and/or an eccentric mounting, as generally described with reference to the drive train 82 for the ball spline shaft 40, or a different arrangement.

Figure 16:
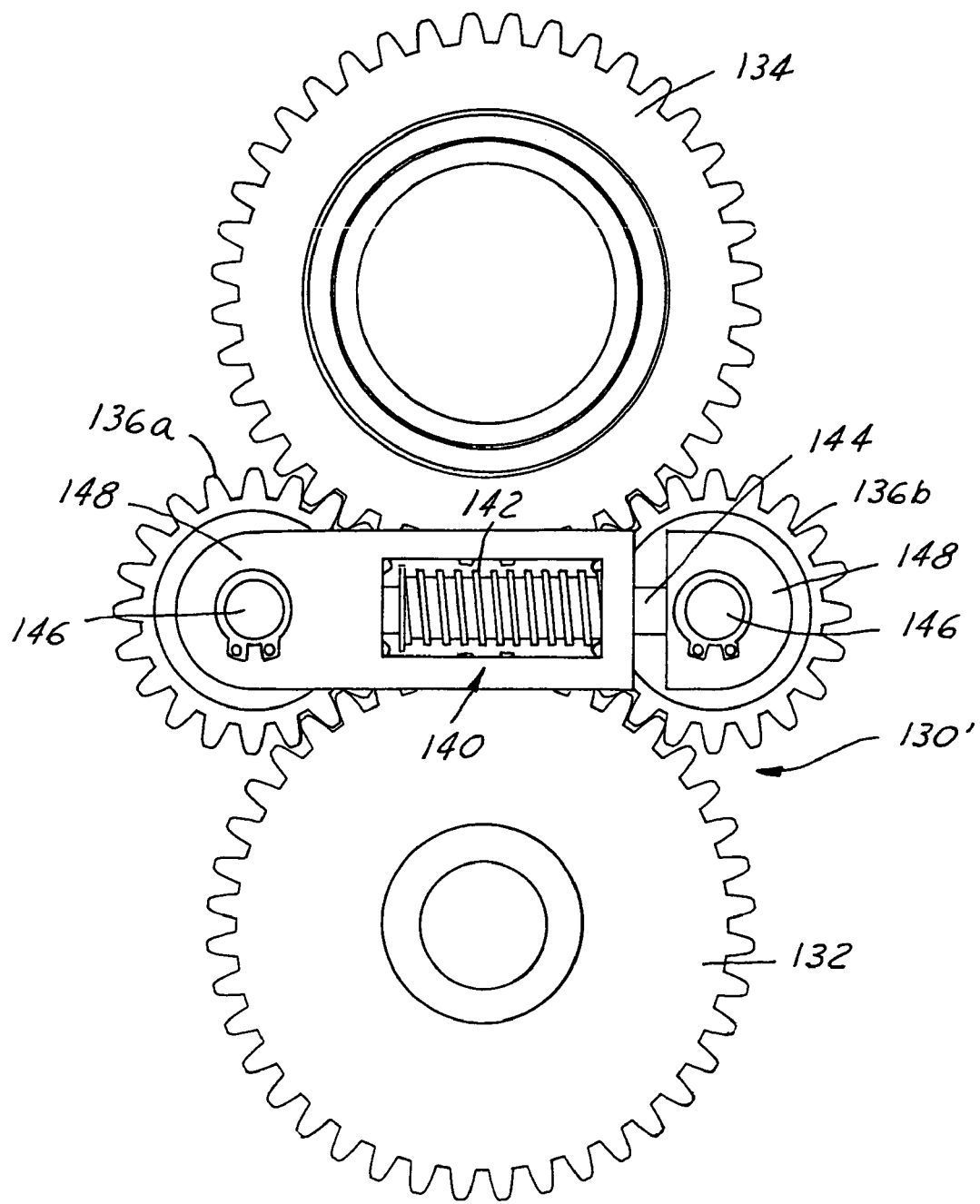
FIG. 16 is a perspective view of an alternate form of a drive train for a ball screw assembly.

As shown in FIG. 16, in another form, the drive train 130' may have a pair of idler gears 136a, 136b that are interconnected by a suspension mechanism 140 that permits some relative movement between the idler gears 136a, 136b. The suspension mechanism 140 may include a biasing member, such as a spring 142, that yieldably biases the idler gears 136a, 136b toward each other. The spring 142 may be connected to a telescoping shaft 144 that is coupled to the pins 146 or shafts about which the idler gears 136a, 136b rotate. The pins 146 are in turn coupled to or carried by associated brackets 148, or a portion of the housing 20.

In one direction of rotation of the drive gear 132, a first idler gear 136a actively transmits the load from the drive gear 132 to the driven gear 134 while the second idler gear 136b is essentially a non-load transmitting gear. When the drive gear 132 is rotated in the other direction, the second idler gear 136b becomes the load transmitting gear and the first idler gear 136a becomes a non-load transmitting gear. The suspension mechanism 140 permits an idler gear 136a, 136b, when it is transmitting load between the drive and driven gears 132,134, to be drawn more closely to the drive and driven gears providing fuller contact between the various gear teeth and reducing backlash in the drive train 130'. The non-load transmitting gear is maintained in tooth-to-tooth intermeshed contact with both the drive gear 132 and the driven gear 134 so that when the direction of rotation of the drive train 130' is reversed, that gear is in position to become the load transmitting gear. The biasing member 142 also provides a "floating" suspension of the idler gears 136a,136b which further helps to reduce or eliminate backlash in the drive train 130'.

In a preferred embodiment, the housing 20 includes a plurality of utility connectors that are carried by the housing 20 for generally simultaneous and automatic connection with mating connectors when the housing is located and put into its final position for use of the invert arm assembly 10. The utility connectors preferably comprise at least one electrical connector through which power is provided to the electric motors 44,50, and at least one fluid connector through which lubricant and/or coolant fluid is provided into the housing 20.

Figure 7:
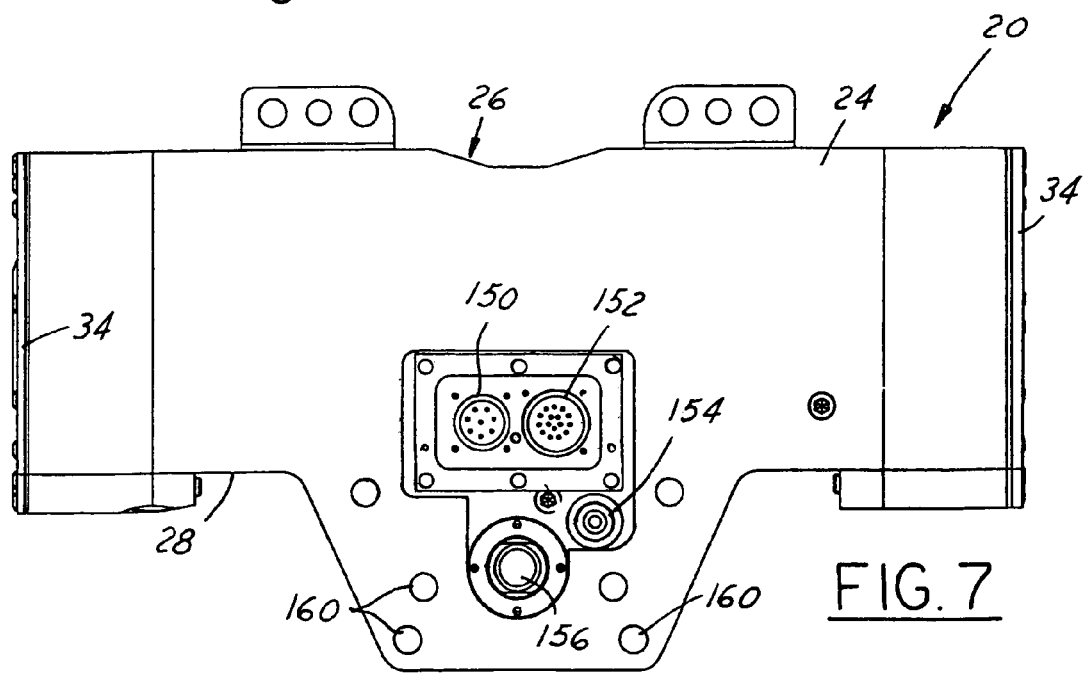
FIG. 7 is a bottom view of the invert arm assembly showing a utility connector module.
Figure 8:
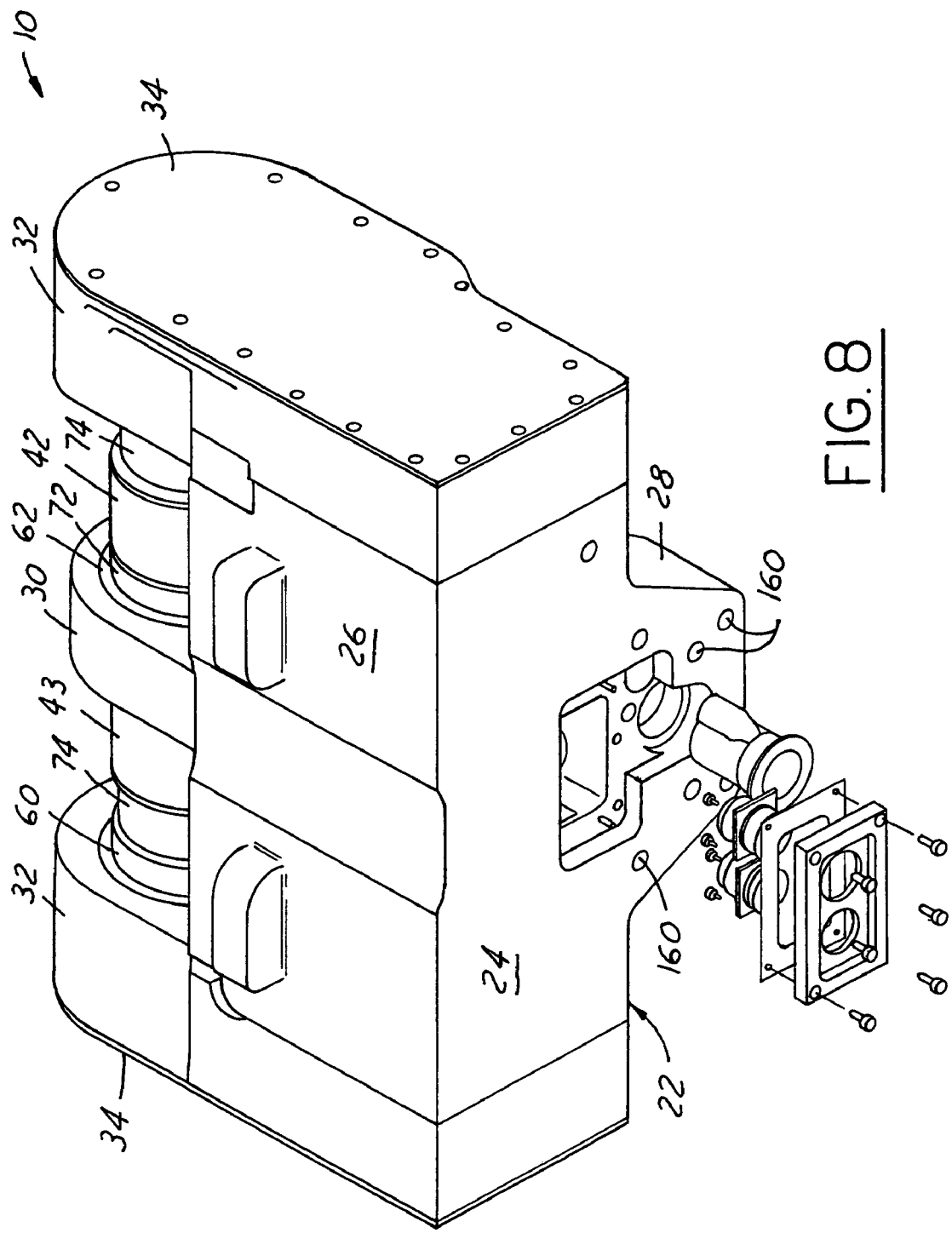
FIG. 8 is an exploded perspective view illustrating components of the utility connector module.

In a presently preferred embodiment, as shown in FIGS. 7 and 8, a pair of electrical connectors are provided with one electrical connector 150 providing power to both the first and second electric motors 44,50, and a second electric connector 152 provided for the resolver signals for the electric motors 44,50, which are preferably servo controlled. Also in the preferred embodiment, a fluid inlet connector 154 is provided through which fluid is provided from a supply into the housing 20, and a fluid outlet connector 156 is provided through which fluid exits the housing 20. The fluid inlet and outlet connectors 154,156 preferably include normally closed valves (not shown) which prevent fluid flow therethrough when closed, and are opened when the connectors are interconnected with their associated mating connectors to permit fluid flow into and out of the housing 20. To facilitate this, the valves are preferably carried adjacent to the bottom 24 of the housing 20 and are engaged and opened by a mating connector or component adjacent to a floor or support surface on which the housing 20 is received in operation of the invert arm assembly 10. Likewise, to facilitate generally simultaneous and automatic connection of all of the electric and fluid connectors 150, 152,154,156 by simply securing the housing in place, each of the connectors is preferably carried by the housing 20 adjacent to its bottom surface 24 and is slidably mated with its respective mating connector so that by simply lowering the housing 20 into place on the floor or support surface the electric connectors 150,152 and fluid connectors 154,156 carried by the housing 20 are automatically interconnected with their respective mating connectors adjacent to the floor. In this manner, each of the electric connectors and the fluid connectors are "blind mate, quick connect" type connectors. To facilitate locating the housing 20 in its proper position on a floor or support surface so that the various connectors are aligned with their respective mating connectors, various locating pins and complementary holes 160 may be provided on one or both of the housing and the floor or support surface on which the housing is to be received.

This blind mate quick connect utility connection arrangement can be used with various glassware forming machines and advantageously provides all electrical and fluid connections to the machine in a compact arrangement and without having to manually interconnect the various connectors. Desirably, if service of the apparatus is required it may be simply lifted from its floor or support surface and the various fluid connectors will be sealed by appropriate valves that close automatically when the housing is lifted. Further, the electric supply and fluid supply lines may be routed within or beneath a floor or support surface on which the housing is received to eliminate overhead or above ground wires and/or tubes which may interfere with or be damaged during the operation of the invert arm assembly.

Accordingly, in use of the invert arm assembly, the ball spline shaft assembly and its motor 44, and the ball screw assembly and its motor 50, are assembled into the housing 20 and the housing 20 is closed and sealed. The housing 20 is then put into position on a floor or support surface thereby automatically connecting the electric power, resolver, fluid inlet and fluid outlet connectors.

As shown in FIG. 1, in forming glass containers one or more glass parisons 170 are disposed within a blank mold 16 to form glass blanks. The neck ring arms 14 are fitted with neck rings 172 adapted to engage the neck portion of a glass parison to permit transfer of the glass parison to the blow mold side of the apparatus. As shown in FIG. 1, the neck ring arms 14 are initially disposed beneath the blank mold 16 and globs of glass used to form the glass parisons are provided into the cavities 174 of the blank mold 16 and onto the neck rings 172. After the glass blanks are formed, the blank mold 16 is opened and the glass blanks disposed on the neck rings 172 are ready for transfer to the blow mold side of the machine.

To transfer the glass blanks to the blow mold side of the machine, a signal is provided to the first electric motor 44 causing it to rotate the ball spline shaft 40 about its longitudinal axis approximately 180 degrees so that the neck ring arms 14 are inverted as shown in phantom lines in FIG. 1, and in solid lines in FIG. 2. This movement of the neck ring arms 14 places the glass blanks between open halves of a blow mold 18 which is then closed providing each glass blank in a separate mold cavity 176. The neck ring arms 14 and neck rings 172 are removed from the glass blanks so that a blow pin head can be positioned adjacent to the neck of the glass blank for subsequent blow molding of the glass blank onto its desired final container shape.

To open the neck ring arms 14 and neck rings 172 to the position shown in FIG. 3 so that they may be removed from the glass blanks, a signal is provided to the second electric motor 50 causing the ball screw 48 to rotate and drive the first and second ball nuts 56,58 away from each other, thereby driving the ball spline nuts 42,43 away from each other and separating the neck ring arms 14. The invert base 12 and neck ring arms 14 carried thereon may now be reverted to their starting position shown in FIG. 1 by reversing the first electric motor 44 to rotate the ball spline shaft 40 back to its starting position. Thereafter, the blank mold 16 and neck ring arms 14 may be closed so that they are in proper position to receive the subsequent charges of glass gobs for a subsequent forming cycle. The neck ring arms 14 are closed (FIG. 2) by reversing the second electric motor 50 to rotate the ball screw 48 such that the ball screw nuts 56,58 are moved axially towards each other, thereby driving the ball spline nuts 42,43 and neck ring arms 14 toward each other.

Desirably, the co-axial arrangement of the ball spline shaft 40 and the ball screw 48 provides a relatively compact invert arm assembly 10. Driving the ball spline shaft assembly and the ball screw assembly with servo controlled electric motors permits precise, accurate repeatable and relatively rapid movement of both the invert base 12 and the neck ring arms 14 for improved timing, ware handling and product quality. Further, improved timing and potentially improved speed of movement of the neck ring arms 14 and invert base 12 can result in increased productivity and fewer defects. Still further, using a single actuator (motor 50 in the disclosed embodiment) to open and close the neck ring arms 14 ensures that both neck ring arms 14 will be moved at the same time, eliminates the variations of performance that can occur when each neck ring arm is driven by a separate actuator which must be separately controlled. Further, pneumatic or hydraulic actuators are subject to variations in performance by changes in air pressure, fluid flow, changes in machine temperature, lubrication and friction.

While certain preferred embodiments and constructions and arrangements of particular components of the invert arm assembly have been shown and described herein, one of ordinary skill in this art will readily understand that modifications and substitutions can be made without departing from the spirit and scope of the invention as defined by the appended claims. For example, without limitation, the ball spline shaft and/or ball spline nuts may have a plurality of ridges and two sets of balls may be used with one set on either side of the ridge to transmit the rotational load from the shaft to the nuts.

The invention claimed is:

1. An invert arm assembly for use in an individual section glassware forming machine, which includes:
   an invert base that is oscillatable about an axis between first and second angularly-spaced positions,
   a ball screw positioned within said invert base coaxially with said axis, said ball screw having spaced oppositely threaded portions,
   first and second nuts each threadably engaging a separate one of said oppositely threaded portions of said ball screw, said nuts being reciprocatable toward and away from each other along said ball screw upon rotation of said ball screw,
   first and second neck ring arms, respectively engaging said first and second nuts, said first and second neck ring arms being reciprocatable toward and away from each other along said axis with said first and second nuts,
   a first reversible electric motor operably associated with said invert base to rotate said invert base about said axis in a pair of opposed directions, and
   a second reversible electric motor operably associated with said ball screw to rotate said ball screw in opposed directions and move said nuts and said neck ring arms toward and away from each other along said axis.

2. The invert arm assembly of claim 1 wherein the invert base includes a ball spline shaft carried for rotation about said axis and having at least one groove formed therein, at least one set of balls associated with at least one groove, and a pair of ball spline nuts operably associated with the ball spline shaft through the balls so that the ball spline nuts rotate with the ball spline shaft in both directions of rotation of the ball spline shaft.

3. The invert arm assembly of claim 2 wherein each ball spline nut includes at least one groove for receipt of at least a portion of said balls so that each ball spline nut is coupled to the ball spline shaft for co-rotation of the ball spline nuts and ball spline shaft.

4. The invert arm assembly of claim 2 wherein the ball spline nuts are carried for slidable reciprocation on the ball spline shaft.

5. The invert arm assembly of claim 2 wherein each ball spline nut includes a neck ring paddle on which a separate neck ring arm is carried so that the neck ring arms are inverted and reverted about said axis as the ball spline shaft is rotated in said one direction and said other direction.

6. The invert arm assembly of claim 5 wherein each neck ring paddle is integrally formed with a ball spline nut.

7. The invert arm assembly of claim 2 wherein said first and second nuts are each operably associated with a separate one of the ball spline nuts so that the ball spline nuts slidably reciprocate along said ball spline shaft as the first and second nuts reciprocate along said ball screw in response to rotation of the ball screw.

8. The invert arm assembly of claim 7 which also comprises at least one clutch pin for each of the first and second nuts, each clutch pin operably associated with one of the first and second nuts and its associated ball spline nut to operably connect them together so that the first nut and its associated ball spline nut co-reciprocate and the second nut and its associated ball spline nut co-reciprocate.

9. The invert arm assembly of claim 8 wherein the ball spline shaft has a plurality of slots formed therein with each slot adapted to receive a clutch pin and permit slidable reciprocation of the clutch pin in said slot relative to the ball spline shaft.

10. The invert arm assembly of claim 1 wherein the ball screw rotates relative to the first and second nuts, and the first and second nuts move axially along the ball screw.

11. The invert arm assembly of claim 1 wherein each of the first and second nuts includes an extension, the extension of each nut being connected to the nut and also being fixed against rotation so that the nut is not rotated by the ball screw.

12. The invert arm assembly of claim 11 which also comprises a housing and a pair of spaced torque tubes connected to the housing so that the torque tubes cannot rotate, each of the first and second nuts being slidably received at least in part in a respective one of the torque tubes, each torque tube being connected to its respective one of the first and second nuts to prevent relative rotation between the torque tube and nut.

13. The invert arm assembly of claim 12 wherein one of the extensions and the torque tubes includes at least one key and the other of the extensions and the torque tubes includes at least one key way, with each keyway adapted to slidably receive a key.

14. The invert arm assembly of claim 11 wherein each of the first and second nuts also includes a bearing sleeve that is reciprocated axially with its associated nut and is rotatably coupled to its associated nut so that each bearing sleeve is capable of rotation relative to its associated nut.

15. The invert arm assembly of claim 14 which also comprises at least one clutch pin for each of the first and second nuts, each clutch pin operably associated with one of the bearing sleeves and an associated ball spline nut to operably connect them together so that the first nut and its associated ball spline nut co-reciprocate and the second nut and its associated ball spline nut co-reciprocate, and wherein rotation of the ball spline nuts causes rotation of the bearing sleeves without rotation of the first and second nuts.

16. The invert arm assembly of claim 15 wherein each bearing sleeve carries at least one clutch pin and each ball spline nut has at least one opening to receive a clutch pin.

17. The invert arm assembly of claim 15 wherein the ball spline shaft has a separate slot for each clutch pin, each slot extending along the axis so that an associated clutch pin can move along the axis relative to the ball spline shaft.

18. The invert arm assembly of claim 1 wherein the second electric motor is connected to the ball screw by a plurality of gears including a drive gear driven for rotation by the second electric motor, a driven gear operably connected to the ball screw to rotate the ball screw, and an idler gear that transmits rotation from the drive gear to the driven gear.

19. The invert arm assembly of claim 18 which also includes a second idler gear connected to the other idler gear by a suspension mechanism that permits relative movement of the idler gears while maintaining meshed engagement of both idler gears with the drive gear and the driven gear.

20. The invert arm assembly of claim 19 wherein the second idler gear is disposed on one side of a line connecting an axis of rotation of the drive gear and an axis of rotation of the driven gear, and the other idler gear is on the other side of the line so that in one direction of rotation of the drive gear, the other idler gear transmits the rotational force to the driven gear, and in the other direction of rotation of the drive gear the second idler gear transmits the rotational force to the driven gear.

21. The invert arm assembly of claim 19 wherein the idler gears are yieldably biased towards each other.

22. The invert arm assembly of claim 19 wherein the suspension device includes a spring that yieldably biases the idler gears towards each other.

23. The invert arm assembly of claim 2 which also includes a plurality of gears through which the first electric motor drives the ball spline shaft for rotation to invert and revert the invert base, the plurality of gears including a drive gear driven for rotation by the first electric motor, a driven gear operably connected to the ball spline shaft to rotate the ball spline shaft, and an idler gear that transmits rotation from the drive gear to the driven gear.

24. The invert arm assembly of claim 23 wherein the idler gear is adjustable to vary its position relative to the other gears.

25. The invert arm assembly of claim 24 which also includes an eccentric on which the idler gear is mounted so that movement of the eccentric permits adjustment of the position of the idler gear.

26. The invert arm assembly of claim 25 which also includes a shaft on which the idler gear is mounted and wherein the eccentric includes a bushing disposed between the shaft and the idler gear, the bushing having at least some eccentricity relative to the shaft.

27. The invert arm assembly of claim 26 which also includes a fixed housing of the assembly and wherein the shaft is adjustably carried by the housing to permit adjustment of the position of the idler gear.

28. The invert arm assembly of claim 27 which also includes an idler gear mounting shaft that includes a pair of opposed adjustment screws and the shaft on which the idler gear is mounted which is movable relative to the mounting shaft and wherein the position of shaft on which the idler gear is mounted relative to said mounting shaft can be maintained by manipulation of said adjustment screws.

29. The invert arm assembly of claim 1 which also includes a housing that provides a sealed enclosure for at least the invert base, the ball screw, and the first and second nuts to facilitate application of fluids to one or more of these components.

30. The invert arm assembly of claim 29 wherein the housing includes a fluid inlet through which fluid enters the housing and a fluid outlet through which fluid may be removed from the housing.

31. The invert arm assembly of claim 30 wherein the fluid inlet includes a fluid inlet connector and said fluid outlet includes a fluid outlet connector, with both the fluid inlet connector and fluid outlet connector being connectable with mating connectors generally simultaneously as the housing is put in place for operation of the invert arm assembly.

32. The invert arm assembly of claim 31 which also includes an utility connector module carried by the housing that includes the fluid inlet connector, the fluid outlet connector, and at least one electrical connector for providing electricity to the first and second electric motors.

33. The invert arm assembly of claim 32 wherein the fluid inlet connector, the fluid outlet connector and each of said at least one electrical connectors are slidably connectable with mating connectors generally simultaneously as the housing is put in place for operation of the invert arm assembly.

34. The invert arm assembly of claim 32 wherein the first and second electric motors are of the servo controlled type and wherein the utility connector module includes at least one resolver electrical connector that is connectable with a mating connector to provide desired signals to a resolver of the electric motors.

35. The invert arm assembly of claim 32 wherein both the first and second electric motors are connected to one electrical connector.

36. The invert arm assembly of claim 34 wherein the resolvers of both the first and second electric motors are connected to one resolver electrical connector.

37. The invert arm assembly of claim 33 wherein the fluid inlet connector, the fluid outlet connector and each of said at least one electrical connectors are of quick connect blind mate connectors so that they are automatically slidably connected with their mating connectors when the housing is put in place.

38. The invert arm assembly of claim 30 wherein the fluid outlet includes a drain valve that is normally closed to prevent fluid from leaving the housing when the housing is not in place for operation of the invert arm assembly and is opened when the housing is secured in place for operation of the invert arm assembly.

39. The invert arm assembly of claim 30 wherein the fluid inlet includes a drain valve that is normally closed to prevent fluid from leaving the housing when the housing is not in place for operation of the invert arm assembly and is opened when the housing is secured in place for operation of the invert arm assembly.

40. An invert arm assembly for use in an individual section glassware forming machine, which includes:
   an invert base that is oscillatable about an axis between first and second angularly-spaced positions and includes a ball spline shaft carried for rotation about said axis and having at least one groove formed therein, at least one set of balls associated with at least one groove, and a pair of ball spline nuts operably associated with the ball spline shaft through the balls so that the ball spline nuts rotate with the ball spline shaft in both directions of rotation of the ball spline shaft,
   a ball screw positioned within said invert base coaxially with said axis, said ball screw having spaced oppositely threaded portions,
   first and second nuts each threadably engaging a separate one of said oppositely threaded portions of said ball screw for reciprocation toward and away from each other along said ball screw upon rotation of said ball screw, each of said first and second nuts being fixed against rotation and operably associated with a separate one of the ball spline nuts so that the ball spline nuts slidably reciprocate along said ball spline shaft as the first and second nuts reciprocate along said ball screw, said ball spline nuts rotating about said axis relative to the first and second nuts,
   first and second neck ring arms, respectively associated with said first and second nuts, said first and second neck ring arms being reciprocatable toward and away from each other along said axis with said first and second nuts,
   a first reversible electric motor operably associated with said invert base to rotate said invert base about said axis in a pair of opposed directions, and
   a second reversible electric motor operably associated with said ball screw to rotate said ball screw in opposed directions and move said first and second nuts and said neck ring arms toward and away from each other along said axis.

41. The invert arm assembly of claim 40 wherein each ball spline nut includes at least one groove for receipt of at least a portion of said balls so that each ball spline nut is coupled to the ball spline shaft for co-rotation of the ball spline nuts and ball spline shaft.

42. The invert arm assembly of claim 40 wherein a separate neck ring arm is carried by each ball spline nut so that the neck ring arms are inverted and reverted about said axis as the ball spline shaft is rotated in said one direction and said other direction.

43. The invert arm assembly of claim 40 which also comprises at least one clutch pin for each of the first and second nuts, each clutch pin operably associated with one of the first and second nuts and its associated ball spline nut to operably connect them together so that the first nut and its associated ball spline nut co-reciprocate and the second nut and its associated ball spline nut co-reciprocate.

44. The invert arm assembly of claim 43 wherein the ball spline shaft has a plurality of slots formed therein with each slot adapted to receive a clutch pin and permit slidable reciprocation of the clutch pin in said slot relative to the ball spline shaft.

45. The invert arm assembly of claim 40 wherein the ball screw rotates relative to the first and second nuts, and the first and second nuts move axially along the ball screw.

46. The invert arm assembly of claim 40 wherein each of the first and second nuts includes an extension, the extension of each nut being connected to the nut and also being fixed against rotation so that the nut is not rotated by the ball screw.

47. The invert arm assembly of claim 46 which also comprises a housing and a pair of spaced torque tubes connected to the housing so that the torque tubes cannot rotate, each of the first and second nuts being slidably received at least in part in a respective one of the torque tubes, each torque tube being connected to its respective one of the first and second nuts to prevent relative rotation between the torque tube and nut.

48. The invert arm assembly of claim 47 wherein one of the extensions and the torque tubes includes at least one key and the other of the extensions and the torque tubes includes at least one key way, with each keyway adapted to slidably receive a key.

49. The invert arm assembly of claim 46 wherein each of the first and second nuts also includes a bearing sleeve that is reciprocated axially with its associated nut and is rotatably coupled to its associated nut so that each bearing sleeve is capable of rotation relative to its associated nut.

50. The invert arm assembly of claim 49 which also comprises at least one clutch pin for each of the first and second nuts, each clutch pin operably associated with one of the bearing sleeves and an associated ball spline nut to operably connect them together so that the first nut and its associated ball spline nut co-reciprocate and the second nut and its associated ball spline nut co-reciprocate, and wherein rotation of the ball spline nuts causes rotation of the bearing sleeves without rotation of the first and second nuts.

51. The invert arm assembly of claim 50 wherein each bearing sleeve carries at least one clutch pin and each ball spline nut has at least one opening to receive a clutch pin.

52. The invert arm assembly of claim 50 wherein the ball spline shaft has a separate slot for each clutch pin, each slot extending along the axis so that an associated clutch pin can move along the axis relative to the ball spline shaft.

53. The invert arm assembly of claim 40 which also includes a plurality of gears through which the first electric motor drives the ball spline shaft for rotation to invert and revert the invert base, the plurality of gears including a drive gear driven for rotation by the first electric motor, a driven gear operably connected to the ball spline shaft to rotate the ball spline shaft, and an idler gear that transmits rotation from the drive gear to the driven gear.

54. The invert arm assembly of claim 53 wherein the idler gear is adjustable to vary its position relative to the other gears.

55. The invert arm assembly of claim 54 which also includes an eccentric on which the idler gear is mounted so that movement of the eccentric permits adjustment of the position of the idler gear.

56. The invert arm assembly of claim 55 which also includes a shaft on which the idler gear is mounted and wherein the eccentric includes a bushing disposed between the shaft and the idler gear, the bushing having at least some eccentricity relative to the shaft.

57. The invert arm assembly of claim 56 which also includes a fixed housing of the assembly and wherein the shaft is adjustably carried by the housing to permit adjustment of the position of the idler gear.

58. The invert arm assembly of claim 57 which also includes an idler gear mounting shaft that includes a pair of opposed adjustment screws and the shaft on which the idler gear is mounted which is movable relative to the mounting shaft and wherein the position of shaft on which the idler gear is mounted relative to said mounting shaft can be maintained by manipulation of said adjustment screws.

59. The invert arm assembly of claim 40 which also includes a housing that provides a sealed enclosure for at least the ball spline shaft, the ball spline nuts, the ball screw, and the first and second nuts to facilitate application of fluids to one or more of these components.

60. The invert arm assembly of claim 59 wherein the housing includes a fluid inlet through which fluid enters the housing and a fluid outlet through which fluid may be removed from the housing.

61. The invert arm assembly of claim 60 wherein the fluid inlet includes a fluid inlet connector and said fluid outlet includes a fluid outlet connector, with both the fluid inlet connector and fluid outlet connector being connectable with mating connectors generally simultaneously as the housing is put in place for operation of the invert arm assembly.

62. The invert arm assembly of claim 61 which also includes an utility connector module carried by the housing that includes the fluid inlet connector, the fluid outlet connector, and at least one electrical connector for providing electricity to the first and second electric motors.

63. The invert arm assembly of claim 62 wherein the fluid inlet connector, the fluid outlet connector and each of said at least one electrical connectors are slidably connectable with mating connectors generally simultaneously as the housing is put in place for operation of the invert arm assembly.

64. The invert arm assembly of claim 62 wherein the first and second electric motors are of the servo controlled type and wherein the utility connector module includes at least one resolver electrical connector that is connectable with a mating connector to provide desired signals to a resolver of the electric motors.

65. The invert arm assembly of claim 64 wherein the resolvers of both the first and second electric motors are connected to one resolver electrical connector.

66. The invert arm assembly of claim 62 wherein the fluid inlet connector, the fluid outlet connector and each of said at least one electrical connectors are of the quick connect blind mate type so that they are automatically slidably connected with their mating connectors when the housing is put in place.

67. The invert arm assembly of claim 61 wherein the fluid outlet includes a drain valve that is normally closed to prevent fluid from leaving the housing when the housing is not in place for operation of the invert arm assembly and is opened when the housing is secured in place for operation of the invert arm assembly.

68. The invert arm assembly of claim 61 wherein the fluid inlet includes a drain valve that is normally closed to prevent fluid from leaving the housing when the housing is not in place for operation of the invert arm assembly and is opened when the housing is secured in place for operation of the invert arm assembly.

69. A glassware forming machine including a blank mold having at least one mold cavity for receipt of at least one glass gob, a forming device to form said at least one glass gob in said blank mold into a glass blank, a final mold having at least one cavity for receipt of at least one glass blank, another forming device to form said at least one glass blank in said final mold into an article of glassware, an invert base driven for oscillation about an axis between first and second positions by a first actuator, and first and second arms carried by the invert base for oscillation with the invert base so that the first and second arms are moved to transfer glass blanks from the blank mold to the final mold, said glassware forming machine including:

a ball screw positioned within said invert base coaxially with said axis about which the invert base is oscillated, said ball screw having spaced oppositely threaded portions, first and second nuts each threadably engaging a separate one of said oppositely threaded portions of said ball screw for reciprocation toward and away from each other along said ball screw upon rotation of said ball screw, each of said first and second nuts being operably associated with a separate one of the first and second arms to reciprocate the first and second arms toward and away from each other along said axis with said first and second nuts, and an actuator operably associated with said ball screw to rotate said ball screw in opposed directions and move said nuts and said neck ring arms toward and away from each other along said axis.

70. The glassware forming machine of claim 69 wherein said actuator includes a reversible electric motor.

71. A method of forming articles of glassware with an apparatus having a blank mold, a final mold, an invert base driven for oscillation about an axis between first and second positions, a ball screw positioned for rotation within said invert base coaxially with said axis and having spaced oppositely threaded portions, first and second nuts each threadably engaging a separate one of said oppositely threaded portions of said ball screw for reciprocation toward and away from each other along said ball screw upon rotation of said ball screw, and first and second neck ring arms each carried by the invert base and coupled to a separate one of the first and second nuts for reciprocation of the first and second neck ring arms toward and away from each other along said axis with said first and second nuts, said method including the steps of:

positioning said invert base in its first position wherein the first and second neck ring arms are disposed adjacent to the blank mold;
  providing at least one glass gob into the blank mold;
  forming said at least one glass gob in said blank mold into at least one glass blank that is carried by the first and second neck ring arms;
  moving the invert base about said axis from its first position to its second position thereby moving the first and second neck ring arms to a position adjacent to the final mold and positioning the glass blanks carried by the first and second neck ring arms in the final mold;
  rotating the ballscrew in one direction to move said first and second neck ring arms away from each other along the invert base to release the glass blanks from the first and second neck ring arms; and
  forming said glass blanks in said final mold into articles of glassware.

72. The method of claim 71 which also includes the step of returning the invert base to its first position in preparation for a subsequent cycle.

73. The method of claim 71 which also includes the step of rotating the ball screw in a direction opposite said one direction to move the first and second nuts toward each other, and thereby move the first and second neck ring arms toward each other in preparation for a subsequent cycle.

* * * * *